US009195495B2

(12) United States Patent
Sahota et al.

(10) Patent No.: US 9,195,495 B2
(45) Date of Patent: Nov. 24, 2015

(54) CONFIGURATION SPACE WITH PSEUDO DEVICE IDENTIFIER

(71) Applicant: Hewlett-Packard Development Company, L.P., Houston, TX (US)

(72) Inventors: Sukhinder Singh Sahota, San Jose, CA (US); Ajitkumar A. Natarajan, Campbell, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/715,249

(22) Filed: May 18, 2015

(65) Prior Publication Data
US 2015/0248307 A1    Sep. 3, 2015

Related U.S. Application Data

(63) Continuation of application No. 13/723,109, filed on Dec. 20, 2012, now Pat. No. 9,063,767.

(51) Int. Cl.
*G06F 13/00* (2006.01)
*G06F 9/455* (2006.01)
*G06F 13/42* (2006.01)
*G06F 13/10* (2006.01)

(52) U.S. Cl.
CPC .......... *G06F 9/45558* (2013.01); *G06F 13/105* (2013.01); *G06F 13/4221* (2013.01); *G06F 2009/45579* (2013.01)

(58) Field of Classification Search
CPC .................... G06F 9/4411; G06F 9/45533
USPC ................................ 718/1; 719/327
See application file for complete search history.

(56) References Cited

U.S. PATENT DOCUMENTS

| 6,766,398 | B2 | 7/2004 | Holm et al. |
| 7,603,500 | B2 | 10/2009 | Brahmaroutu |
| 7,689,751 | B2 | 3/2010 | Feehrer |
| 2011/0296411 | A1 | 12/2011 | Tang et al. |
| 2012/0084487 | A1 | 4/2012 | Barde |
| 2012/0137288 | A1 | 5/2012 | Barrett et al. |
| 2012/0151473 | A1 | 6/2012 | Koch et al. |
| 2012/0185632 | A1 | 7/2012 | Lais et al. |
| 2014/0033234 | A1 | 1/2014 | Wang et al. |
| 2014/0068607 | A1 | 3/2014 | Tsirkin et al. |
| 2014/0156894 | A1 | 6/2014 | Tsirkin et al. |

OTHER PUBLICATIONS

Vasseur, J.L. et al; Standardized but Flexible I/o for Self-virtualizing Devices; http://static.usenix.org/events/wiov08/tech/full_papers/levasseur/levasseur_html/ >; Oct. 16, 2012.

*Primary Examiner* — Andy Ho
(74) *Attorney, Agent, or Firm* — Hewlett-Packard Patent Department

(57) ABSTRACT

Techniques for loading device drivers are provided. A configuration space may contain a device identifier. The configuration space may be modified by replacing the device identifier with a pseudo device identifier. In one aspect the pseudo device identifier may be passed to a virtual machine. In another aspect, the pseudo device identifier may be used to load a driver.

15 Claims, 7 Drawing Sheets

CONFIGURATION SPACE WITH PSEUDO DEVICE IDENTIFIER

PRIORITY

This application is a Continuation of commonly assigned and U.S. patent application Ser. No. 13/723,109, filed Dec. 20, 2012, entitled "CONFIGURATION SPACE WITH PSEUDO DEVICE IDENTIFIER", which is incorporated by reference in its entirety.

BACKGROUND

Virtualized computing systems are becoming more prevalent in today's computing environment. In a virtualized system, a hypervisor and/or a host operating system (OS) allow multiple instances of an operating system to execute on shared hardware. Each instance of an operating system is referred to as a guest operating system. Each guest operating system, from its own perspective, behaves as if it has full control over the physical hardware. The hypervisor and/or host OS is responsible for ensuring that the guest operating system's use of the hardware does not interfere with one another.

In a fully virtualized environment, all guest operating system Input/Output (IO) activity is emulated. For example, when a guest operating system interacts with an IO device, such as a Peripheral Component Interconnect (PCI) card that enables network or storage access, the hypervisor and/or host OS may emulate the device. A driver in the guest operating system that would normally interact with the physical PCI card would actually be interacting with the hypervisor and/or host OS. The hypervisor and/or host OS would pass the IO requests to the physical PCI card, taking into account that other guest operating systems may be using the same PCI card.

In non-fully virtualized systems, IO functionality may be directly handled by the guest operating system itself. For example, a PCI card may be directly assigned to a guest operating system, which is responsible for initialization and utilization of the functions of the card, thus bypassing the hypervisor and/or host OS. In some cases, the functions of a PCI card may be divided between guest operating systems. For example, in a PCI express IO virtualization (PCIe IOV) environment, virtual functions of a PCI card may be directly assigned to a guest operating system. In such environments, the guest operating system, through an appropriate driver, communicates directly with one or more functions provided by the PCI card. In such environments, the interaction with the hypervisor and/or host OS for IO activities is reduced.

DETAILED DESCRIPTION

Figure 1:
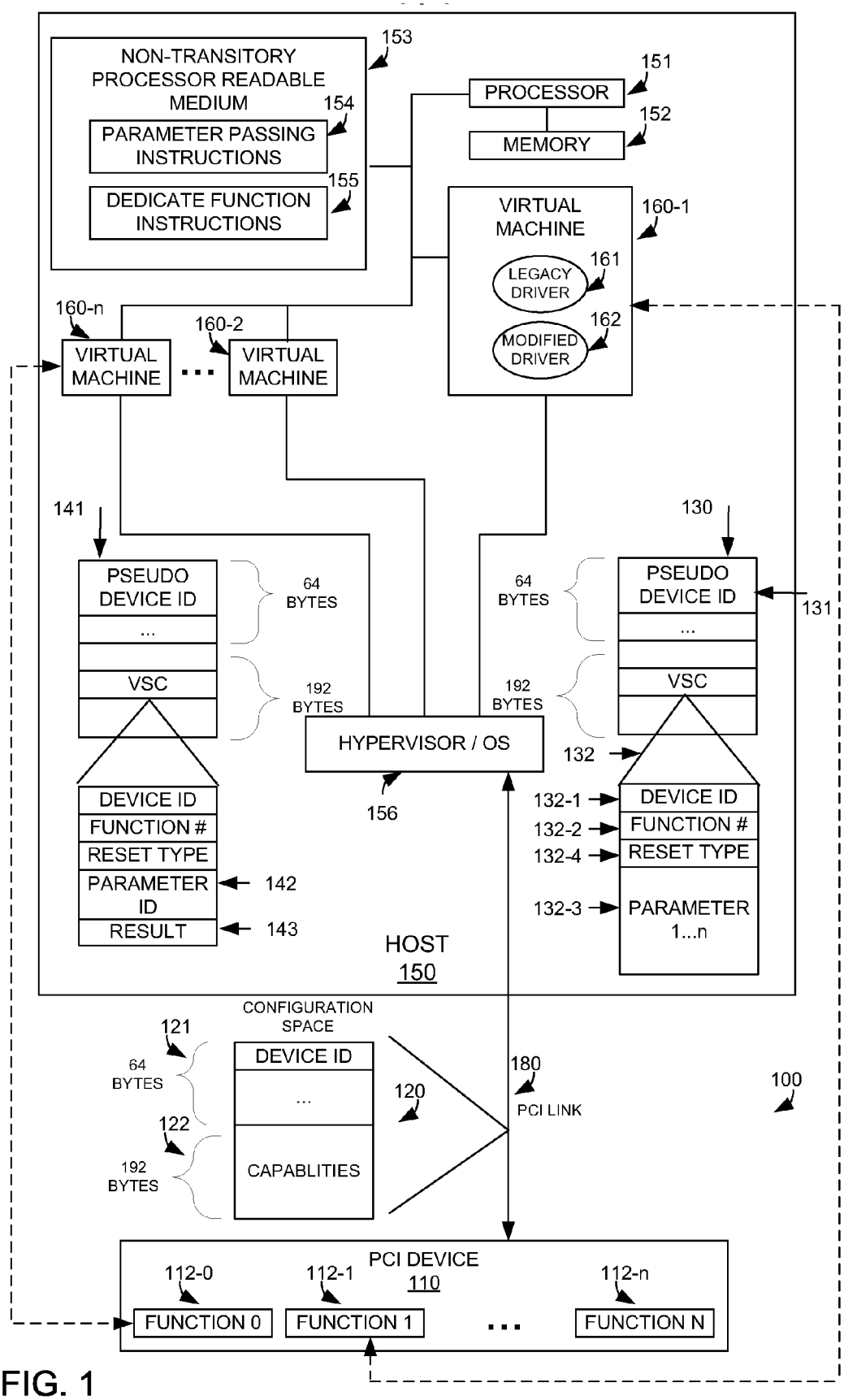
FIG. 1 is an example of a system that may utilize the techniques for parameter passing described herein.

The techniques described above for providing guest operating systems access to IO resources are not without problems. For example, in the case of a fully virtualized system, all IO requests must first pass through the hypervisor and/or host OS before proceeding to the actual hardware. Typically, this may involve the processor performing a context switch between a process associated with the guest operating system and a process associated with the host OS and/or hypervisor. The context switch may increase the latency of the IO action, thus reducing performance. Even in systems where a context switch is not needed, the interaction with the host OS and/or hypervisor may introduce latency.

In a non-fully virtualized system, a PCI card may be assigned to a single guest operating system, which may then communicate with the PCI card directly, thus bypassing the hypervisor and/or host OS. Although this may reduce the latency described above, it comes at a cost of dedicating the entire PCI card to a single guest operating system, thus reducing the benefits of hardware sharing. For example, a PCI Ethernet card may have 4 ports, each of which is presented as a function of the card. When the entire card is assigned to a single guest operating system, all four ports may only be used by that guest operating system. Thus, there is no granularity in assigning functions. It is either the entire PCI card or none of the PCI card. As such, the benefits of hardware sharing are reduced, because there is no hardware sharing between guest operating systems.

In the PCIe IOV environment, virtual functions of a PCI card may be individually assigned to guest operating systems. Although PCIe IOV may resolve some of the problems described above, it introduces a new problem in that PCIe IOV requires hardware support. In other words, in order to utilize PCIe IOV, the PCI card's hardware must have been specifically designed to use PCIe IOV. PCI cards that are not so designed cannot have their functions individually assigned. Furthermore, PCIe IOV is a relatively new feature and has not yet been widely adopted by the industry.

The techniques described herein overcome many of the problems described above. Functions of a PCI card may be assigned individually to guest operating systems, thus overcoming the need to assign the entire card as a whole. The functions may be assigned such that the guest operating system is able to partially bypass the hypervisor and/or host OS when utilizing a function that has been assigned to the guest. For example, the data path and some of the control path may bypass the hypervisor and/or host OS. Furthermore, the above improvements are achieved without the need for hardware or software support in the PCI card.

The term PCI card is used throughout the description to refer generally to functionality provided by an IO card and is not limited to the PCI specification or any particular version of the specification. For example, PCI card may refer to conventional PCI, PCI extended (PCI-X), and PCI Express (PCIe). Furthermore, the techniques described herein are applicable to any protocol that follows the general mechanism of use of a configuration space to facilitate communications between a host and an IO card.

FIG. 1 is an example of a system that may utilize the techniques for parameter passing described herein. The system 100 may include a PCI device 110 coupled to a host 150 over a PCI link 180. Although only a single PCI device and host are shown, it should be understood that there may be any number of hosts, each of which may be connected to any number of PCI devices. Furthermore, although the PCI link is shown as directly connecting the host and PCI device, such a direct connection is not required. There may be PCI bridges, switches, and any number of other elements between the host and the PCI device.

The PCI device 110 may be any type of device that is connected to the host. For example, the PCI device may be a PCI card that provides IO functionality, such as an Ethernet card. As another example, the PCI device may be a device that provides connectivity to storage devices, such as a Fibre channel host bus adaptor. The techniques described herein are not dependent on any particular type of functionality provided by the PCI device.

The PCI device may include a number of functions 112-1 . . . n. A PCI function may provide some desired functionality. For example, a PCI Ethernet card may have 4 ports and each port is implemented as a function. Each function may have a configuration space through which the host and function communicate for purposes of initialization and operation. Operation of the configuration space is described in further detail below.

The host 150 may be any type of computing device that may couple to PCI devices. For example, the host may be a computer, such as a server computer. The host device may include a processor 151 coupled to a memory 152. The processor may read and execute processor instructions that are stored in the memory in order to implement the techniques described herein. The memory may include any type of volatile or non-volatile memory, such as DRAM, SRAM, FLASH, or any other suitable type of memory. In addition, the processor may be coupled to a non-transitory processor readable medium 153. The non-transitory processor readable medium may store thereon a set of processor executable instructions. For example, there may be parameter passing instructions 154 and dedicate function instructions 155, which will be described in further detail below. In some implementations the processor may directly execute instructions from the non-transitory processor readable medium. In other implementations, the instructions may be first transferred from the non-transitory processor readable medium to the memory prior to execution.

The host may also include an OS 156. In addition to the normal functions provided by an OS, the OS may be capable of providing virtual machines, which are described in further detail below. In some implementations, the OS may not support virtual machines directly, but rather uses a hypervisor in order to implement virtual machines. Regardless of implementation, the hypervisor and/or OS provide the host with the ability to implement virtual machines.

The host may also include virtual machines 160-1 . . . n. As mentioned above, a virtual machine runs an instance of an OS. This OS may be the same type of OS as the hypervisor/OS or it may be of a different type. Furthermore, each virtual machine may not necessarily run the same type of OS. For example, the host OS 156 may be a Windows™ type of OS, virtual machine 160-1,2 may run a UNIX™ OS, and virtual machine 160-n may run a Linux™ based OS. From the perspective of the OS running on the virtual machine, the machine appears to be a physical machine with all hardware of the machine dedicated to the virtual machine. The hypervisor/OS is responsible for hiding the fact that the virtual machines are running on shared hardware from the individual virtual machines. In general, a virtual machine runs an instance of an operating system which may be referred to as a guest OS. For purposes of this description, a reference to a virtual machine may also include the guest OS.

The operating systems on each of the virtual machines may contain device drivers for communicating with the PCI device. The device drivers, also referred to as drivers, may be a collection of processor executable instructions that allow the virtual machine to communicate with the physical PCI card. A legacy driver 161 may be a driver that is unaware of the techniques described herein. In other words, the legacy driver is intended for use in cases where the OS is not running on a virtual machine and has complete control over the PCI device. A modified driver 162 is a driver that is aware of the techniques presented herein and may be capable of working in a virtual machine environment as well as a non-virtual machine environment. As was mentioned above, the OS running in a virtual machine is not aware that it is running on shared hardware, and as such believes it has full control of the hardware. As will be described in further detail below, the techniques described herein provide a mechanism such that the legacy driver in a virtual machine does not load and attempt to control PCI functions assigned to the virtual machine using the techniques described herein. PCI functions that have been assigned to a particular virtual machine may be controlled by a modified driver.

In operation, at initialization time, the host 150 will perform a PCI enumeration process to determine all PCI cards that are connected to the host. In the enumeration process, the host attempts to read the PCI configuration space of function number zero for all installed PCI devices. The PCI specification ensures that all devices implement at least function number zero, such that a failure to read the configuration space of function number zero indicates that no device is installed and no further enumeration is needed for that device. If a response is received for function number zero, a PCI device is present. The host may then proceed to read the PCI configuration space for the next function number. Again, no response indicates that the function is not implemented. The process repeats until the maximum number of possible functions is reached.

For purposes of the description below, only a single PCI device 110 is shown as installed. However, it should be understood that the techniques described herein are applicable regardless of how many PCI devices have been installed. As shown in FIG. 1, the host 150, in conjunction with the hypervisor/OS 156 may read the PCI configuration space 120 of each function on the PCI device. The PCI configuration space is a 256 byte region of registers used to discover and initialize a PCI function. Although FIG. 1 depicts the PCI configuration space being read as a single 256 byte block, this is not intended to imply that this is how the data is transferred, but rather is a logical depiction of the entire PCI configuration space. As actually implemented, the configuration space, or portions of the configuration space may be read in smaller segments, such as 1, 2, 4, 8, or any other number of bytes at a time. Only portions of the configuration space that are needed may be read.

The first 64 bytes 121 of the configuration space are standardized and contain information including the device ID and Vendor ID, which may be used, perhaps in conjunction with other IDs contained in that space, to identify the manufacturer of the device as well as the particular model of the device. This combination of information may be used by the hypervisor/OS to determine the proper driver to load for the device. For purposes of the remainder of this description, the device ID may refer to information that is used to identify how the device is configured, such as which driver to use.

The 256 byte PCI configuration space includes 192 bytes of space for capabilities of the device. There are many possible capabilities, most of which follow a defined structure, although the capabilities may vary in length. Each capability may include a capability identifier and a pointer to the next capability. The capabilities are arranged as a linked list, with one capability using its pointer to point to the beginning of the next capability in the list. There is one type of capability, referred to as the Vendor Specific Capability (VSC) which does not have a defined structure, aside from the capability identifier and next pointer. A vendor is free to populate the VSC in any way desired. Use of the VSC will be described in further detail below.

As part of the initialization process, the host 150 in conjunction with the hypervisor/OS 156 will configure each function such that information may be transferred between the host and the function. For example, the base address registers of each function may be set to map to a particular region of memory mapped IO space. The host and the function may then communicate by reading/writing data to the mapped region. Once the above steps are complete, the hypervisor/OS is able to communicate with each function on the PCI device 110.

The hypervisor/OS may be configured by a system administrator to instantiate one or more virtual machines. As mentioned above, a virtual machine may run its own instance of an operating system. As shown in FIG. 1, the hypervisor/OS is configured to instantiate virtual machines 160-1 . . . n. Furthermore, the hypervisor/OS may be configured by the administrator to dedicate functions on the PCI device for exclusive use by one of the virtual machines. For example, an Ethernet or Fibre Channel PCI card may contain 4 ports, each of which is implemented as a function. The hypervisor/OS may dedicate each of the four available functions to a different virtual machine for exclusive use by that virtual machine.

When a virtual machine is instantiated, the OS of the virtual machine is not aware that it is running within a virtual machine. Furthermore, each virtual machine may not be aware of other virtual machines running on the host. Thus, the virtual machine may go through a normal enumeration process as described above. However, instead of enumerating the physical PCI devices, the virtual machines enumeration process enumerates PCI devices emulated by the hypervisor/OS 156 or assigned to the virtual machine by the hypervisor/OS 156 using the techniques described herein.

For example, assume that function one 112-1 is to be dedicated to virtual machine 160-1 and the remaining functions, including function zero are to be dedicated to other virtual machines. As explained above, the enumeration process of virtual machine 160-1 may attempt to read the configuration space of function zero to determine if a device is present. Because real function zero is not being assigned to virtual machine 160-1, a response indicating the absence of function zero would cause virtual machine 160-1 to believe that no device is present. The hypervisor/OS may overcome this problem by emulating the response to the attempted configuration space read to indicate that function zero is present, even though real function zero is not being assigned to virtual machine 160-1. In other words, function one's configuration space may be emulated such that it appears to the virtual machine to be function zero. Thus, virtual machine 160-1 is made aware that a device is installed, even though function zero of the device is not going to be dedicated to virtual machine 160-1.

The hypervisor/OS may further modify the emulated response in order to prevent problems related to the device drivers in the virtual machines. As explained above, the response to a configuration space read may include a device ID which is used by the OS to determine which device driver is to be used for communication with the device. If the hypervisor were to include the real device ID in the response, this may cause the OS in the virtual machine to load a legacy driver 161. The legacy driver may not be aware of the fact that the function number provided in the emulated response is not the actual function number on the device that has been assigned to the virtual machine. For example, the device driver may need to read a function specific parameter from the function on the device. Examples of such parameters may include an Ethernet MAC address or a Fibre Channel worldwide unique port/node name. Other example parameters may include tables or registers that are indexed by the real function number. In the current example, function zero as emulated by the hypervisor/OS to virtual machine 160-1 is actually function one on the real device. A legacy driver would not know this and as a result would attempt to read the function specific parameter associated with real function zero, which would be incorrect.

In order to overcome this problem, the emulated response 130 from the hypervisor/OS may replace the real device ID with a pseudo device ID 131. The pseudo device ID may be associated with a modified driver 162. The modified driver may be based on the legacy driver, but is modified to handle the techniques described herein, as will be explained in further detail below. In other words, the pseudo device ID is associated with a driver for the device 110 that has been modified to work with the techniques described herein. By replacing the real device identifier with the pseudo device identifier, the possibility of loading the legacy driver is eliminated.

As mentioned above, the hypervisor/OS may need to pass parameters to the modified driver, such as the Ethernet MAC address of the function. The techniques presented herein make use of vendor capabilities, such as the vendor specific capability, provided by the PCI specification in order to transfer these parameters. As shown in FIG. 1, a VSC 132 is included in the capabilities list of the configuration space 130. The PCI specification does not define the contents of the VSC and a vendor is able to use this capability in any desired way. The techniques described herein use the VSC in order to pass parameters between the hypervisor/OS 156 and the modified driver 162 in the virtual machine 160-1.

For example, as explained above, the real device ID may cause problems if it is included in the standardized portion of the configuration space. However, the real device ID may be needed by the modified device driver for proper operation. The hypervisor may include the real device ID in a VSC. Because the modified device driver is aware of the techniques described herein, whenever the real device ID is needed, the modified driver knows it can be retrieved from the VSC. Likewise, in some cases, the modified driver may need to use the real function number of the device instead of the emulated function number provided by the hypervisor/OS. Again, the real function number may be retrieved from the VSC. Any number of other parameters 132-3, such as the Ethernet MAC address or Worldwide unique port/node name, may be included in the VSC for passing between the hypervisor/OS and the modified device driver.

The techniques described above allow for a function of a PCI card to be dedicated to a specific virtual machine and provide for the ability to pass parameters between the hypervisor/OS and the modified driver. However, a problem remains which relates to assignment granularity and resetting the device. As mentioned above, the techniques described herein do not require that the PCI device support assignment of functions individually to virtual machines. However, this means that the PCI device may also not support individual reset of a function. In some cases, resetting an individual function may require resetting the entire device. A problem may arise if functions are assigned to different virtual machines but cannot be individually reset. If one virtual machine needs to reset a function assigned to it and resets the entire device, this may impact other virtual machines.

In order to overcome this problem, a reset type 132-4 may be included in the VSC. The reset type may notify the modified driver of the granularity of assignment of functions to various virtual machines and the proper way to reset the function. For example, if all functions of the device are assigned to one virtual machine, resetting the entire device would not cause a problem, as the virtual machine would know that all functions are going to be reset. The reset type may also be used by the hypervisor to reset the device when the virtual machine is rebooted or the function is unassigned from the guest. However, in cases where functions are assigned to different virtual machines, and the ability to reset individual functions is not available, the result may be that reset is not possible. The reset type may be used to notify the modified driver of the best way to reset a function or that individual reset is not possible.

In an alternate implementation, all parameters may not be included in the VSC at the same time. As mentioned above, the capabilities section of the configuration space is relatively small at 192 bytes. Instead of using a large amount of this available space to transfer all parameters, the parameters may be passed in a request/response model. For example, as shown in configuration space 141, the VSC may include a parameter ID field 142 and a result field 143. When the modified driver wishes to retrieve a parameter from the hypervisor/OS, the modified driver may write an identifier of the parameter into the parameter ID field. The hypervisor/OS may then populate the result field 143 with the value of the desired parameter. The modified driver may then read the value from the result field. In some implementations, the hypervisor/OS may populate the result field in response to the read. What should be understood is that the parameter may be passed in a request/response sequence. The particular order of the steps to populate the result field is unimportant. This process may continue until all needed parameters are read. The process may also work to pass parameters from the modified driver to the hypervisor/OS. In such a case, the modified driver may write a value to the result field, which may then be read by the hypervisor/OS. In this way, an arbitrary amount of parameter data may be passed between the modified device driver and the hypervisor/OS without regard to the 192 byte limit.

Although the above description has been presented in terms of a VSC, this is not intended to be limiting. The PCI specification also provides for an extended configuration space of 4096 bytes, which includes the 256 bytes of configuration space, which can be used to store extended capabilities. A Vendor Specific Extended Capability (VSEC) is similar to a VSC, except that it resides in the extended configuration space address range. For purposes of this description, a vendor capability is any field that may be used to transfer data structured in a vendor specific manner. A VSC and a VSEC are simply two examples of vendor capabilities.

Figure 2:
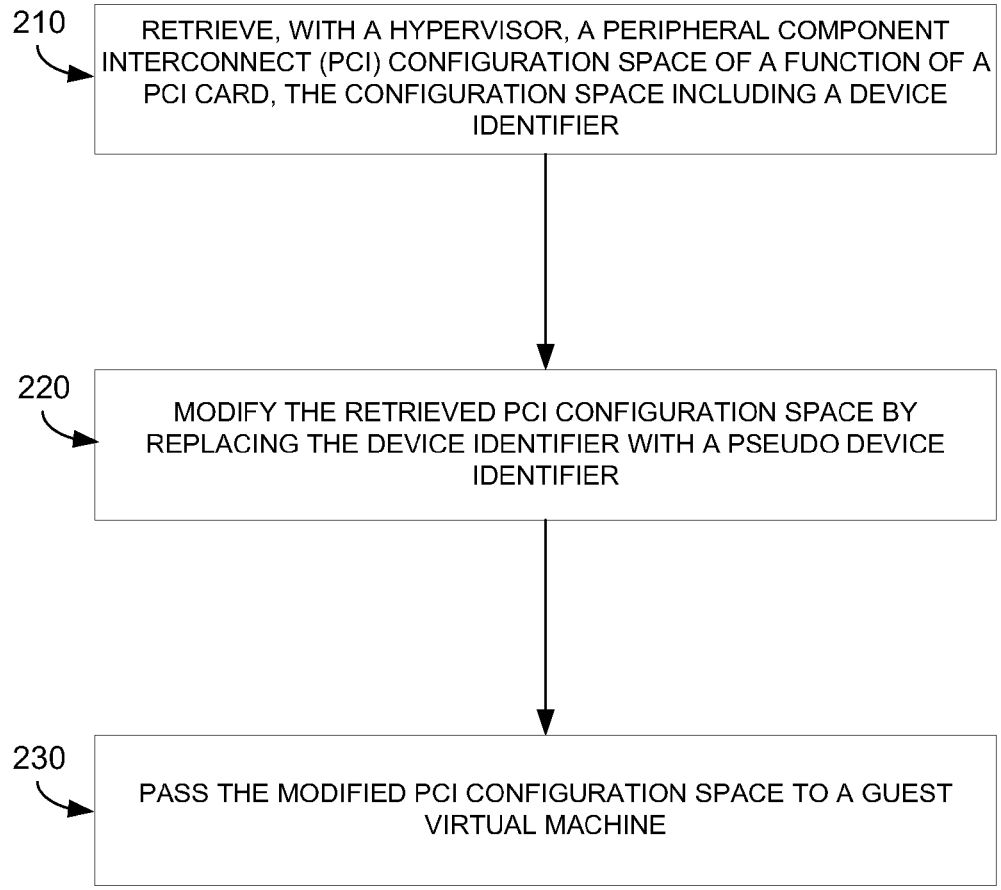
FIG. 2 is an example of a high level flow diagram for passing parameters.

FIG. 2 is an example of a high level flow diagram for passing parameters. In block 210, a hypervisor may retrieve a PCI configuration space of a function of a PCI card. The configuration space may include a device identifier. As mentioned above, the configuration space need not be retrieved all at once and the complete configuration space need not be retrieved. For example, retrieving the configuration space initially may include only retrieving the field necessary to determine the device ID. For example, the vendor ID and the device ID fields of the configuration space may be retrieved to determine the device identifier.

In block 220 the retrieved PCI configuration space may be modified by replacing the device identifier with a pseudo device identifier. In one implementation, the modification may be made by replacing the vendor ID in the configuration space with a vendor ID belonging to the vendor who is implementing the system described herein. The device ID may then be replaced with a device ID that is reserved by the implementing vendor. The implementing vendor may be aware that the newly formed device identifier is associated with the physical PCI card.

In block 230, the modified PCI configuration space may be passed to a guest virtual machine. The guest virtual machine may use the device identifier to determine which device driver to load to utilize the function. By modifying the device identifier, the guest virtual machine may no longer load the legacy device driver associated with the function. Rather, the modified device identifier may be used to allow the guest virtual machine to load a modified device driver.

Figure 3:
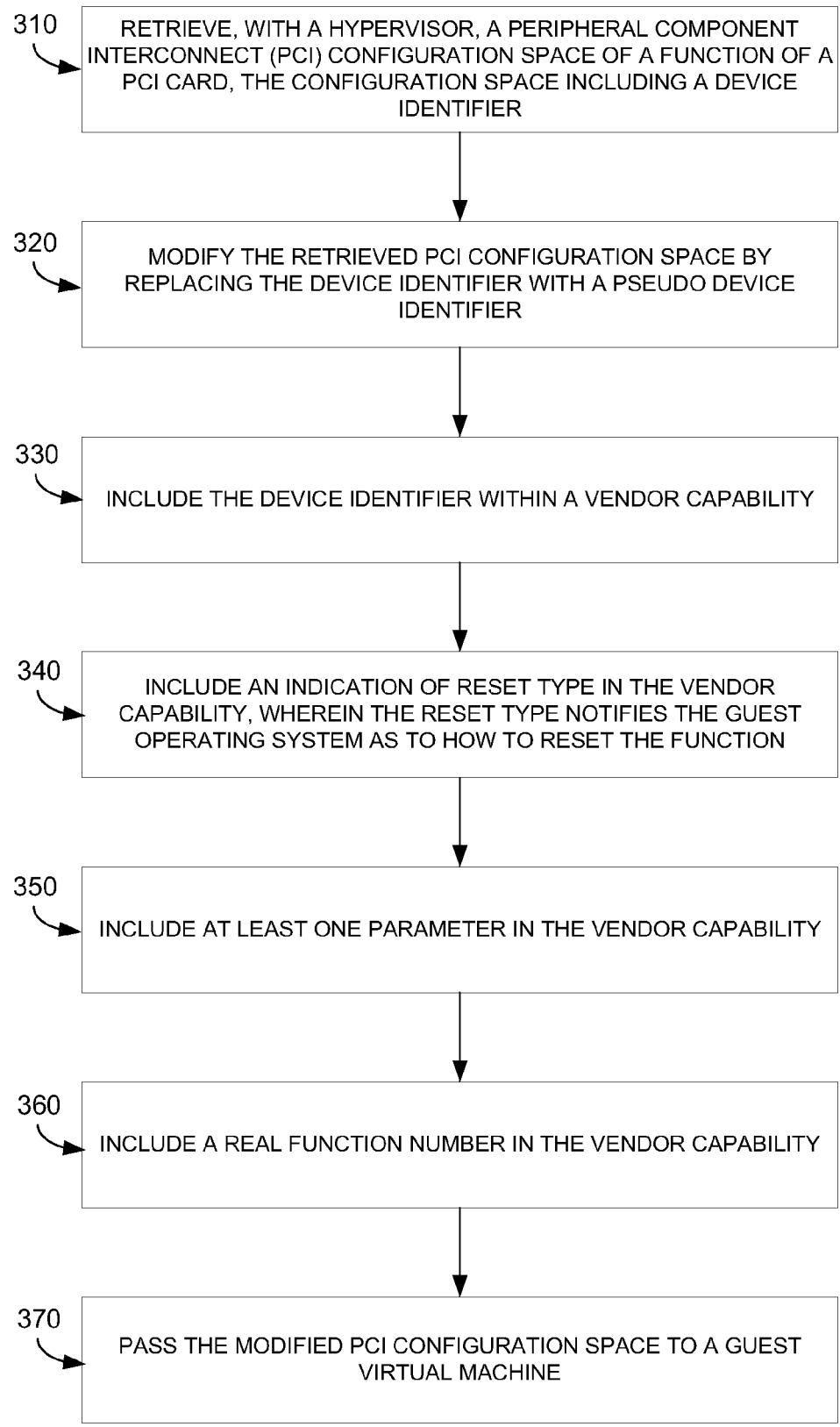
FIG. 3 is an example of a high level flow diagram for passing parameters and reset type.

FIG. 3 is an example of a high level flow diagram for passing parameters and reset type. In block 310, just as above, a hypervisor may retrieve a PCI configuration space of a function of a PCI card. The configuration space may include a device identifier. In block 320, the retrieved PCI configuration space may be modified by replacing the device identifier with a pseudo device identifier.

In block 330, the device identifier may be included within a vendor capability. In some cases, the guest virtual machine may need to know the actual device identifier. By including the device identifier in a vendor capability, the original value of the device identifier may be passed to the modified device driver. If the modified device driver needs the real device identifier, it may be retrieved from the vendor capability. Two example types of vendor capabilities are the VSC and the VSEC. However, techniques described herein would be applicable to any other mechanism of allowing a vendor to pass data in a vendor specific manner within the configuration space.

In block 340, an indication of a reset type may be included in the vendor capability. The reset type may notify the guest operating system as to how to reset the function. As described above, individual function reset may not be available. The reset type may notify the modified driver as to how the function should be reset. In some cases, the entire card may need to be reset in order to reset the function, which would also impact other guest virtual machines that have also been assigned functions on the PCI card.

In block 350, at least one parameter may be included in the vendor capability. The host/hypervisor may need the ability to pass parameters to/from the modified driver. For example, the Ethernet MAC address of the function may need to be passed to the modified device driver. The modified device driver is aware that parameters to be passed are included in the vendor capability and may retrieve the parameters from that field.

Likewise, in some cases, the modified driver may need to know the real function number of the function that is being assigned to the guest virtual machine. For example, real function number one may be presented to the guest virtual machine as function number zero. However, the modified driver may need to know the actual function number on the physical card in order to properly communicate with the function. In block 360, the real function number may be included in the vendor capability. Thus, if the modified driver needs the real function number, it can be retrieved from the vendor capability. In block 370, the modified PCI configuration space may be passed to a guest virtual machine.

Figure 4:
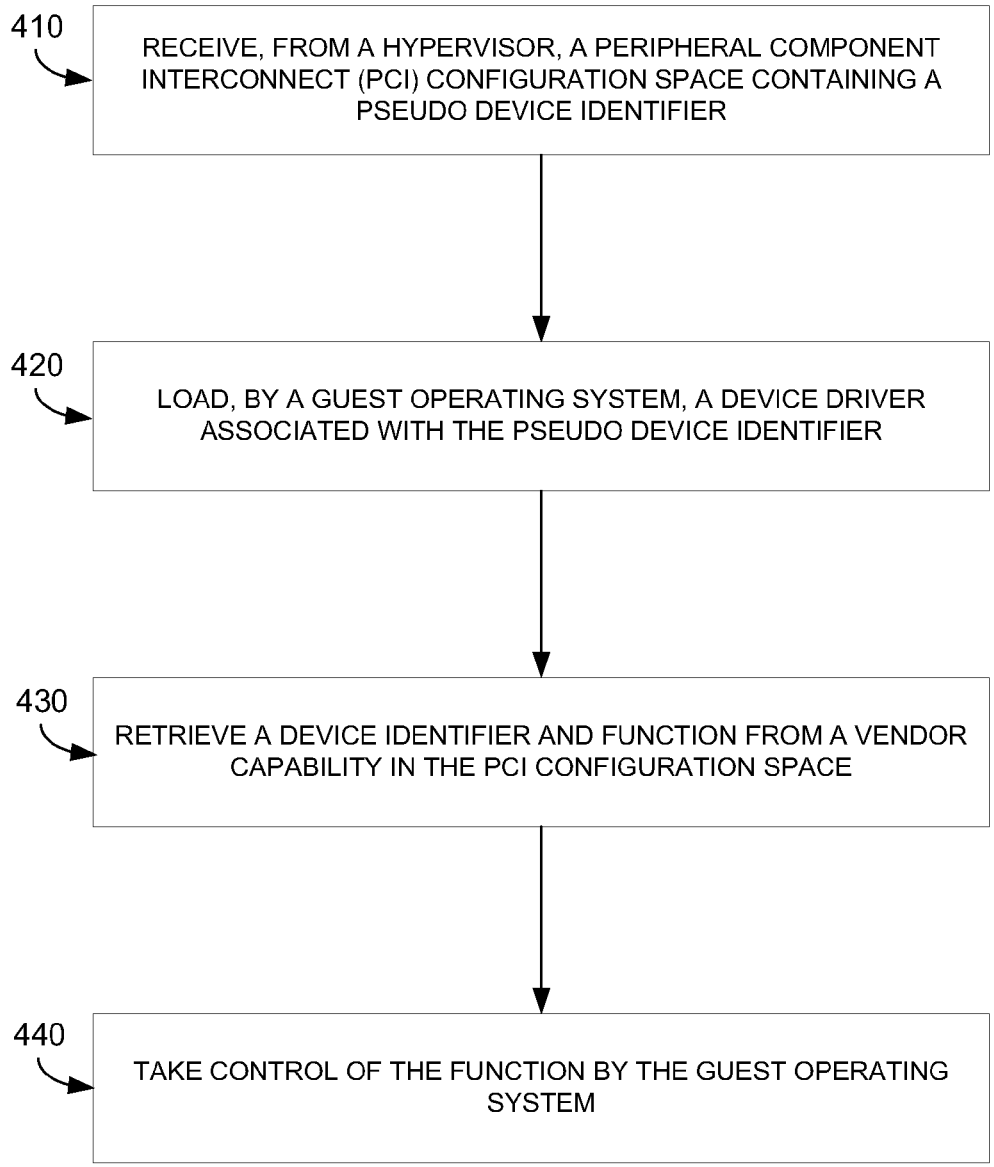
FIG. 4 is an example of a high level flow diagram for taking control of a function.

FIG. 4 is an example of a high level flow diagram for taking control of a function. In block 410, a PCI configuration space containing a pseudo device identifier may be received from a hypervisor. As above, the configuration space need not be received all at once. Only the portions of the configuration space that are needed for the particular operation may be received. The hypervisor may emulate the configuration space of a function of a PCI card.

In block 420, a guest operating system may load a device driver associated with the pseudo device identifier. The pseudo device identifier may allow the guest operating system to select and load a device driver that has been modified to utilize the techniques described herein. The modified device driver is aware of the parameter passing mechanism.

In block 430, a device identifier and function may be retrieved from a vendor capability in the PCI configuration space. In some cases, the modified driver may need to know the real device identifier and function number in order to take control of the function of the PCI card. This information may be passed to the modified device driver in the vendor capability. The modified device driver may have been modified such that it is aware that the real device identifier and function number are located in the vendor capability.

In block 440, the guest operating system may take control of the function of the PCI card through the modified device driver. The modified device driver is able to communicate directly with the function on the PCI card, bypassing the hypervisor/OS. Any parameters that are needed by the modified device driver that cannot be obtained directly from the function on the PCI card may be passed from the hypervisor/OS to the modified device driver in the vendor capability.

Figure 5:
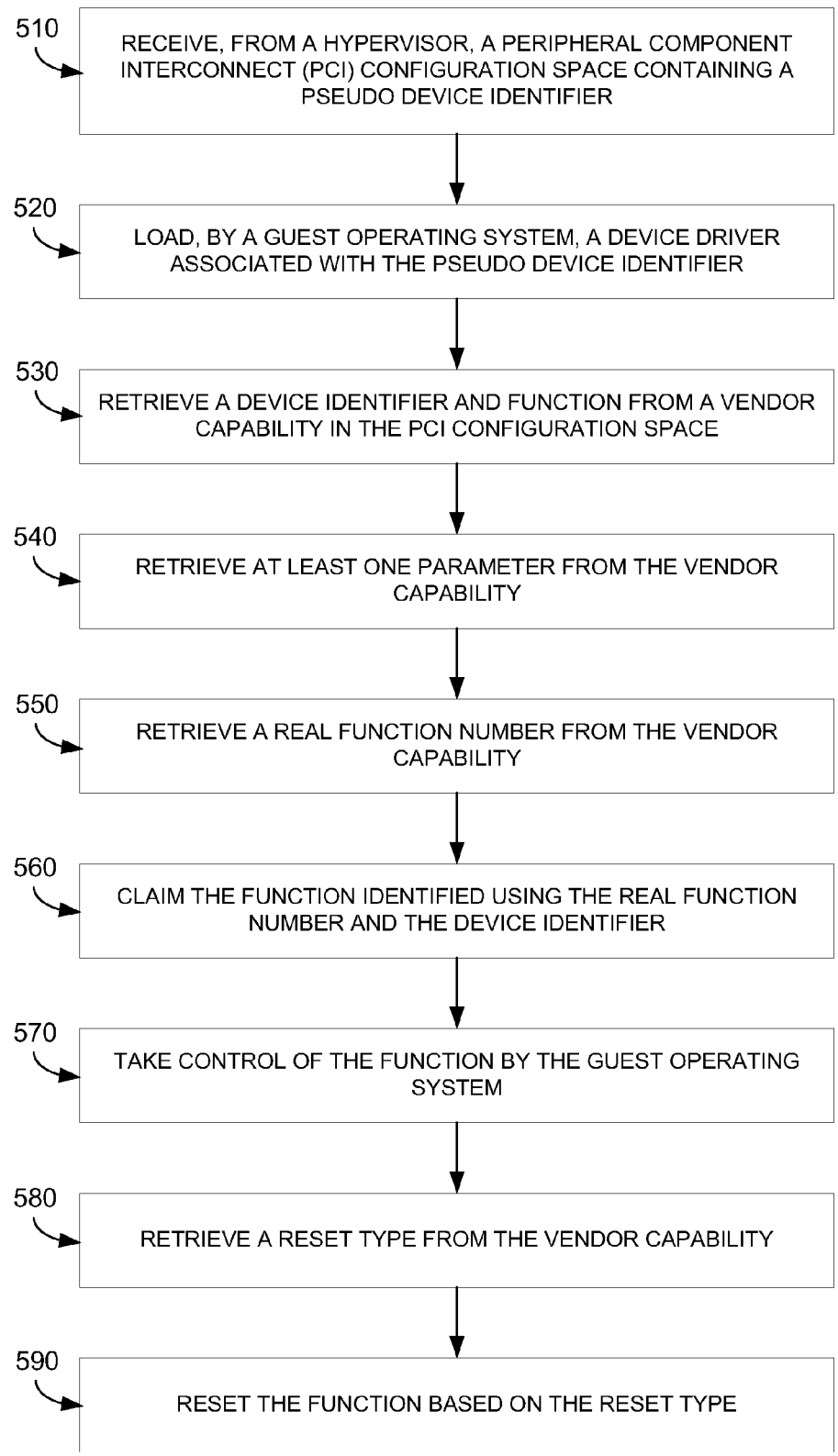
FIG. 5 is an example of a high level flow diagram for taking control of and resetting a function.

FIG. 5 is an example of a high level flow diagram for taking control of and resetting a function. In block 510, as above, a PCI configuration space containing a pseudo device identifier may be retrieved from a hypervisor. In block 520, a guest operating system may load a device driver associated with the pseudo device identifier. In block 530, a device identifier and function number may be retrieved from a vendor capability in the PCI configuration space.

In block 540, at least one parameter may be retrieved from the vendor capability. As explained above, in some cases, the guest operating system may need parameters associated with the function that cannot be directly retrieved from the PCI card. These parameters may be passed from the hypervisor to the guest operating system by including the parameters in a vendor capability. The modified device driver is modified such that it knows to retrieve the parameter from the vendor capability as opposed to from the PCI card itself.

In block 550, a real function number may be retrieved from the vendor capability. In some cases, the modified device driver may need to know the actual function number on the PCI card. This function number may be different than the function number that was presented in the emulated configuration space during the device enumeration conducted by the guest operating system. The modified device driver is modified such that it is aware that the actual function number on the physical PCI card may be retrieved from the vendor capability should the actual function number be needed.

In block 560, the modified device driver may claim the function identified using the real function number and device identifier. Once a function has been assigned to the guest operating system, the modified device driver in the guest operating system may begin directly communicating with the function, thus bypassing the hypervisor. In block 570 the guest operating system may take control of the function.

In block 580, a reset type may be retrieved from the vendor capability. As explained above, because the guest operating system may not have control of all functions on the PCI card and that the PCI card may not provide the ability to reset functions individually, the guest operating system may need to be told how to perform a reset of the function. The type of reset to perform, which may include the fact that no function level reset is possible, may be included in the vendor capability. In block 590, the modified device driver may reset the function based on the reset type.

Figure 6:
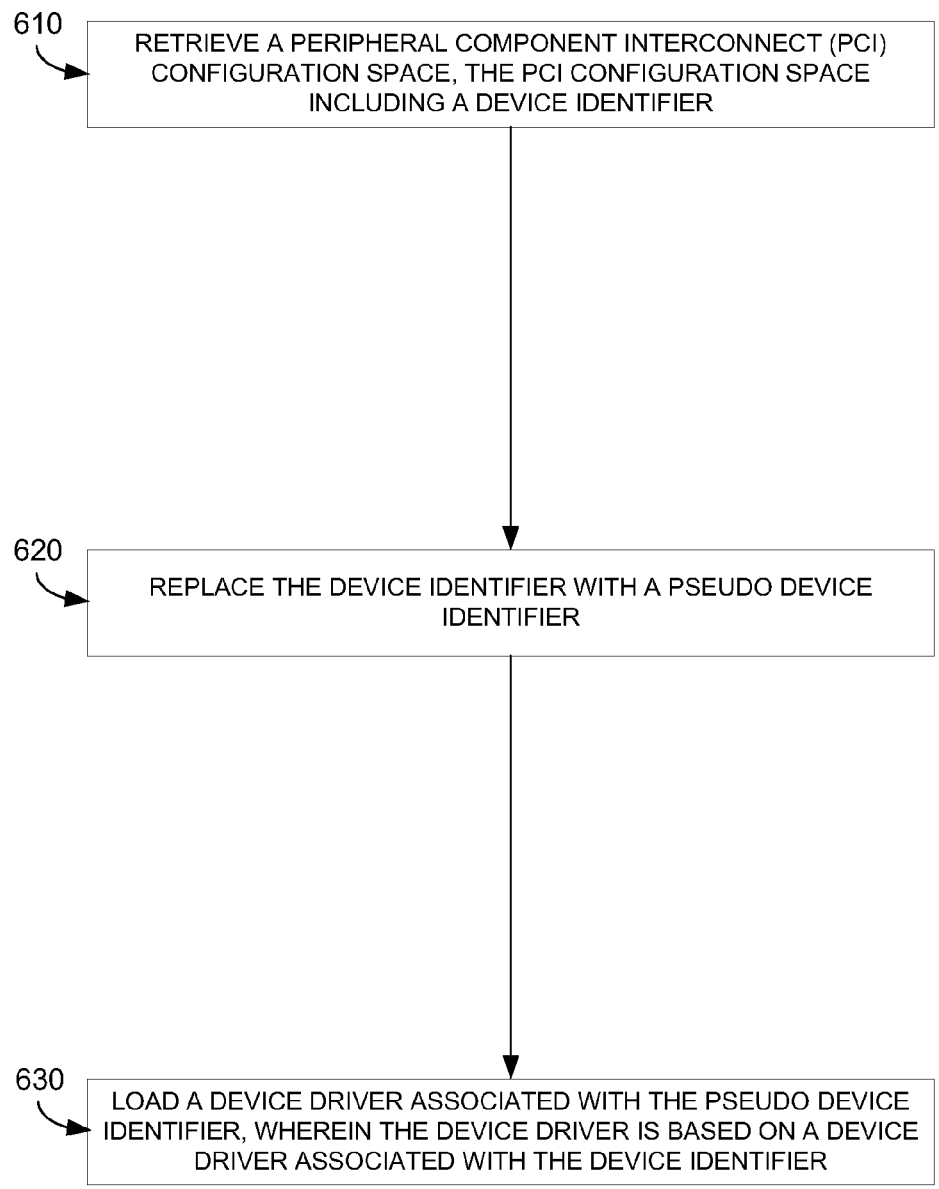
FIG. 6 is an example of a high level flow diagram for identifying and loading a device driver.

FIG. 6 is an example of a high level flow diagram for identifying and loading a device driver. In block 610, a PCI configuration space including a device identifier may be retrieved. For example, the processor on a host may retrieve the configuration space when it is running the hypervisor/operating system. In block 620 the device identifier may be replaced with a pseudo device identifier. Again, this may be done by the hypervisor/OS.

In block 630, a device driver associated with the pseudo device identifier may be loaded. The device driver may be based on a device driver associated with the device identifier. The processor when running a guest operating system may retrieve the PCI configuration space that includes the pseudo device identifier. The guest operating system may then load a modified device driver that is associated with the pseudo device identifier. The modified device driver may operate in the same general manner as the device driver that is associated with the real device identifier, with the exception that the modified device driver is aware of the parameter passing techniques described herein.

Figure 7:
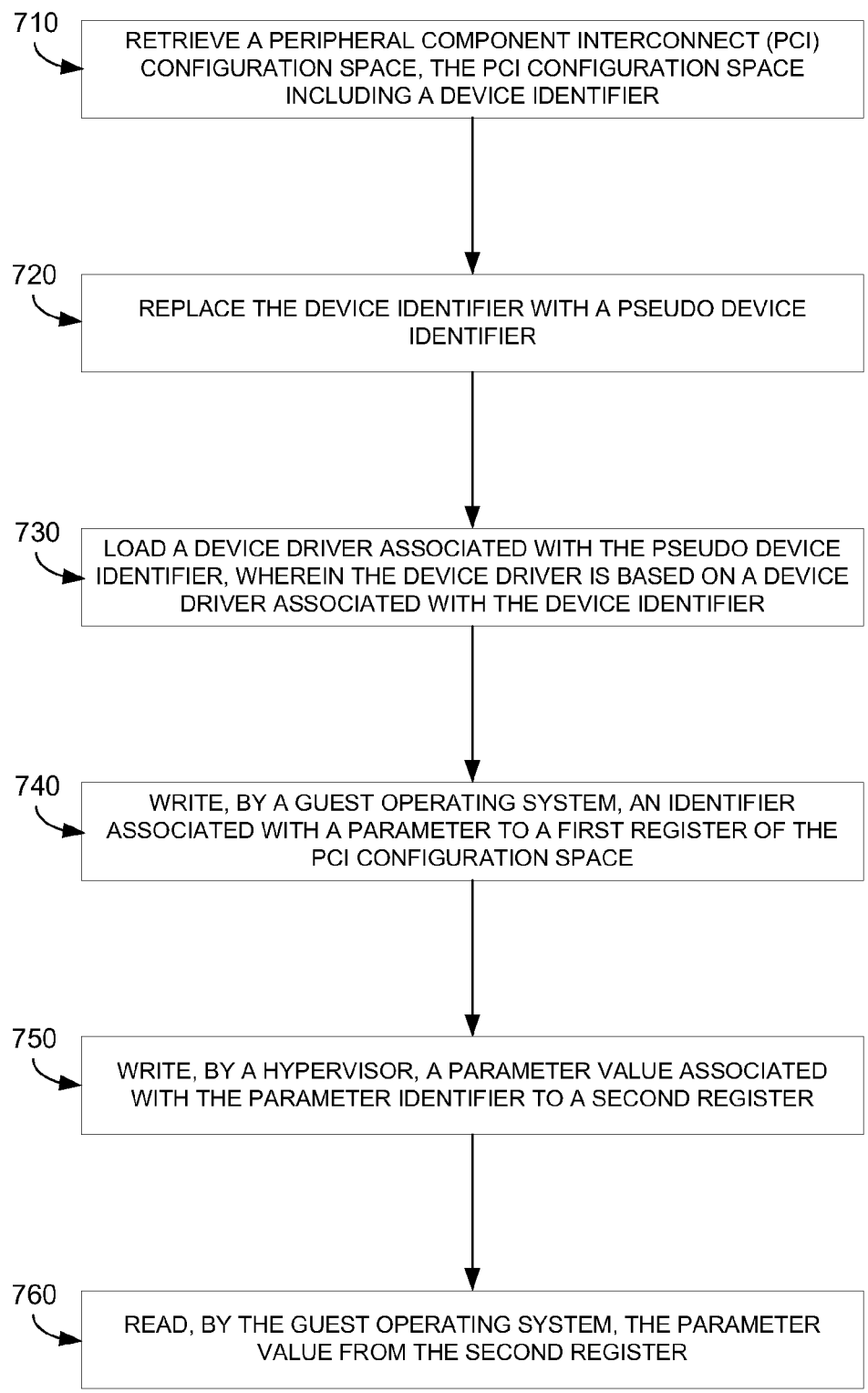
FIG. 7 is an example of a high level flow diagram for identifying and loading a device driver and passing a parameter.

FIG. 7 is an example of a high level flow diagram for identifying and loading a device driver and passing a parameter. In block 710, just as above, a PCI configuration space including a device identifier may be retrieved. In block 720, the device identifier may be replaced with a pseudo device identifier. In block 730, a device driver associated with the pseudo device identifier may be loaded.

In block 740, an identifier associated with a parameter may be written to a first register by a guest operating system. As explained above, the processor when running instructions for the virtual machine may write an identifier of a parameter to the PCI configuration space. This identifier may indicate the parameter for which a value should be provided.

In block 750, the parameter value associated with the parameter may be written to a second register by the hypervisor. In other words, when the processor is running code associated with the hypervisor, the parameter value associated with the parameter identified by the parameter identifier may be stored in a second register in the PCI configuration space.

In block 760, the value of the parameter may be read from the second register by the guest operating system. In other words, the guest operating system indicates the parameter whose value is to be read by writing an parameter identifier to a first register of the PCI configuration space. The hypervisor may then populate a second register with the value of the identified parameter. The guest operating system may then retrieve the value of the parameter by reading the second register from the PCI configuration space. Accordingly, the guest operating system and the hypervisor may exchange the values of any number of parameters, regardless of the size of the PCI configuration space.

We claim:

1. A system comprising:
   a processor; and
   a memory coupled to the processor, the memory containing instructions which when executed by the processor cause the processor to:
   retrieve, with a hypervisor, a Peripheral Component Interconnect (PCI) configuration space of a function of a PCI card, the configuration space including a device identifier;
   modify the retrieved PCI configuration space by replacing the device identifier with a pseudo device identifier; and
   pass the modified PCI configuration space to a guest virtual machine.

2. The system of claim 1, wherein the memory further contains instructions which cause the processor to include the device identifier within a vendor capability.

3. The system of claim 2, wherein the vendor capability is one of a vendor specific capability and a vendor specific extended capability.

4. The system of claim 2, wherein the memory further contains instructions which cause the processor to:
   include an indication of reset type in the vendor capability, wherein the reset type notifies the guest operating system as to how to reset the function of the PCI card.

5. The system of claim 2, wherein the memory further contains instructions which cause the processor to:
   include at least one parameter in the vendor capability.

6. The system of claim 2, wherein the memory further contains instructions which cause the processor to:
   include a real function number in the vendor capability.

7. A method comprising:
   receiving, by a processor, a Peripheral Component Interconnect (PCI) configuration space containing a pseudo device identifier from a hypervisor;
   loading a device driver associated with the pseudo device identifier into a guest operating system;
   retrieving a device identifier and function from a vendor capability in the PCI configuration space; and
   taking control of the function in the guest operating system.

8. The method of claim 7, wherein the vendor capability is a vendor specific capability.

9. The method of claim 7, wherein the vendor capability is a vendor specific extended capability.

10. The method of claim 7, further comprising:
    retrieving at least one parameter from the vendor capability.

11. The method of claim 7, wherein taking control of the function in the guest operating system further comprises:
    retrieving a real function number from the vendor capability;
    claiming the function identified using the real function number and the device identifier.

12. The method of claim 7, further comprising:
    retrieving a reset type from the vendor capability; and
    resetting the function based on the reset type.

13. A non-transitory processor readable medium containing a set of instructions thereon, which when executed by a processor cause the processor to:
    retrieve a Peripheral Component Interconnect (PCI) configuration space, the PCI configuration space including a device identifier;
    replace the device identifier with a pseudo device identifier; and
    load a device driver associated with the pseudo device identifier, wherein the device driver is based on a device driver associated with the device identifier.

14. The non-transitory medium of claim 13, further comprising instructions which cause the processor to:
    write an identifier associated with a parameter to a first register of the PCI configuration space;
    write a parameter value associated with the parameter identifier to a second register; and
    read the parameter value from the second register.

15. The non-transitory medium of claim 13, wherein to write the identifier to the first register and to read the value from the second register, comprises instructions which cause the processor to repeat the writing of the identifier to the first register and the reading the value from the second register until all needed parameters have been read.

* * * * *